United States Patent [19]

Stinar, Sr. et al.

[11] Patent Number: 4,766,689
[45] Date of Patent: Aug. 30, 1988

[54] FISH HOOK UNSNAGGER AND METHOD

[76] Inventors: Winfred A. Stinar, Sr., Rte. 3, Box 427; Winfred A. Stinar, Jr., Rte. 3, Box 393, both of Bagley, Minn. 56621

[21] Appl. No.: 54,231

[22] Filed: May 26, 1987

[51] Int. Cl.⁴ ............................................. A01K 97/00
[52] U.S. Cl. ...................................... 43/17.2; 43/42.36
[58] Field of Search .................... 43/17.2, 42.36, 44.87

[56] References Cited

U.S. PATENT DOCUMENTS

| | | | |
|---|---|---|---|
| 720,136 | 2/1903 | Halliran | 43/17.2 |
| 2,097,536 | 11/1937 | Shirk | 43/17.2 |
| 2,184,589 | 12/1939 | Griffith . | |
| 2,385,415 | 9/1945 | Jackson | 43/17.2 |
| 2,526,031 | 10/1950 | Kocarek | 43/17.2 |
| 2,534,790 | 12/1950 | Moore | 43/17.2 |
| 2,630,680 | 3/1953 | Parker . | |
| 2,741,067 | 4/1956 | Cox | 43/44.9 |
| 3,224,132 | 12/1965 | Frantz | 43/17.2 |
| 3,359,676 | 12/1967 | Crossman . | |
| 3,672,088 | 6/1972 | Dolls . | |
| 3,735,520 | 5/1973 | Jarrett | 43/17.2 |
| 4,085,537 | 4/1978 | Todd | 43/17.2 |

Primary Examiner—Nicholas P. Godici
Assistant Examiner—Karen Skillman
Attorney, Agent, or Firm—James V. Harmon

[57] ABSTRACT

A fishing hook and lure unsnagger is provided for jarring loose a hook or both the hook and lure connected to a fishing line. The unsnagger comprises a weight such as a piece of metal or concrete having an elongated opening extending from one end to the other and being constructed and arranged to slide easily along the line. The opening is of sufficient size and internal smoothness to slide over any existing swivels, knots, sinkers or spinners and the like connected between the line and the hook so that it will strike the hook or fishing lure with sufficient force to jar the hook loose from an underwater object upon which the hook has become inadvertently snagged.

5 Claims, 1 Drawing Sheet

FISH HOOK UNSNAGGER AND METHOD

FIELD OF THE INVENTION

The present invention relates to fishing equipment and more particularly to a method and apparatus for removing and retrieving snagged fish hooks.

BACKGROUND OF THE INVENTION

A variety of different devices have been previously proposed for removing snagged fish hooks. For example, long poles or other articles such as rakes have been used to reach down into the water for this purpose. A variety of other devices have been proposed. For example, it has been proposed to provide a sack or bag-like device in the nature of a sea anchor which can be connected to the line to pull the line away from the article upon which the hook is snagged.

It is also known in the fishing art to connect sinkers made of lead to the fishing line. Sometimes these sinkers are able to slide on the line. They are used, however, simply for keeping the lure near the bottom and are not adapted to slide over swivels, knots and other objects connected between the line and the bait nor are they useful in retrieving snagged lures.

To overcome these and other deficiencies of the prior art it is an object of the invention to provide a fish hook unsnagger and method which will allow hooks and lures having hooks connected to them to be easily and quickly released from underwater bodies upon which they have become snagged.

SUMMARY OF THE INVENTION

The present invention provides a fish hook unsnagger for jarring loose a hook connected to a fishing line while the hook remains connected to the line. The unsnagging device comprises a weight having an opening associated with it. The weight is constructed and arranged to slide freely on the line and the opening is of sufficient size and internal smoothness to slide easily over existing swivels, knots and the like connected between the line and the hook. Thus, when the unsnagger is allowed to slide down the line it will thereby strike the hook and/or fishing lure connected to the hook with a considerable impact, the impact being sufficient to jar the hook loose from the underwater object upon which the hook has become caught. In summary, then, in accordance with the method of the present invention the line to which the hook is connected is held straight and sufficiently tight so that the unsnagger can slide on it toward the plug. The unsnagger is placed on the line above the hook and allowed to slide freely down the line with sufficient speed that it will strike the hook or the lure connected to the hook with sufficient impact to jar the hook loose.

The invention will be better understood by reference to the following specification and figures which illustrate the example by way of example and not by way of limitation.

THE FIGURES

Figure 1:
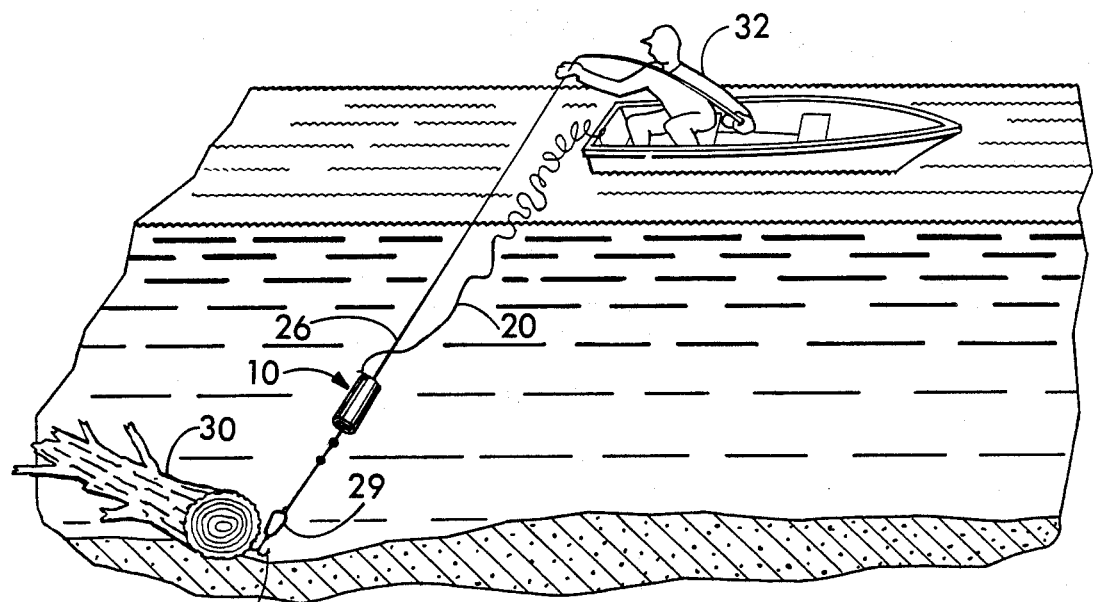
FIG. 1 is a perspective diagrammatic view illustrating the method of removing snagged hooks and fishing plugs in accordance with the present invention.
Figure 2:
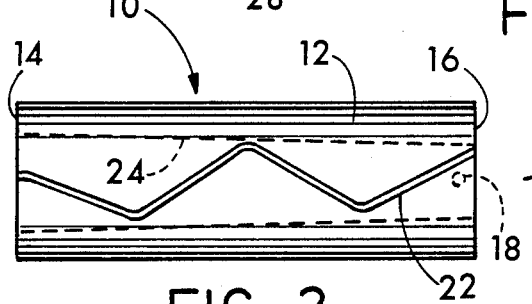
FIG. 2 is a bottom view of the unsnagger.

As shown in the figures the unsnagger, indicated generally at 10, comprises a cylindrical body 12 having bottom and top ends 14 and 16 with a small opening 18 provided for tying a cord or lanyard 20 to the body 12. The unsnagger body is provided with a line insertion slot 22 extending from the bottom end 14 to the top end 16 and communicating internally with a longitudinally extending central opening 24 which communicates at its ends with the bottom and top ends 14 and 16 of the unsnagger so that during use when the fishing line 26 is slipped in to the opening 24 through the line insertion opening 22 the unsnagger body 12 will be free to slide easily down the line 26 toward the hook 28 and fishing lure or plug 29 if present striking it with considerable force and with sufficient impact to jar the hook 28 loose from an underwater object such as a tree limb 30 upon which the hook 28 has become inadvertently snagged to the chagrin of the fisherman 32.

The unsnagger 10 can be formed from a variety of materials, the one in the drawing being formed from steel about 2 inches in diameter and about 6 inches long. The opening 24 at the bottom end 14 is about 1¼ inches in diameter and at the upper end 16 is about ⅞ inch in diameter. Thus the opening 24 is constructed and arranged so that it will slide easily over sinker 60, spinners, swivel 61 and the like right down to the hook 28 or the lure 29 as the case may be to unsnag it.

Figure 3:
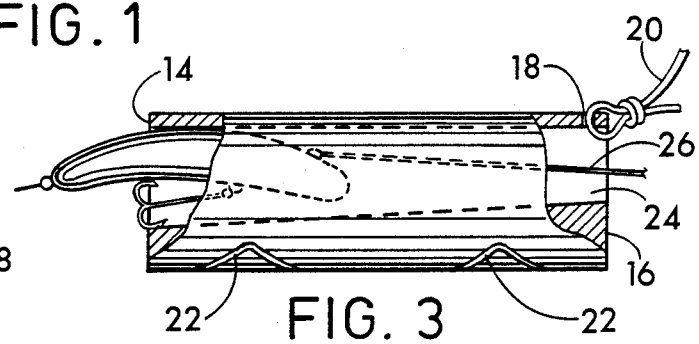
FIG. 3 is a side elevational view of the unsnagger partly in section as it appears just after having struck a fishing plug.
Figure 4:
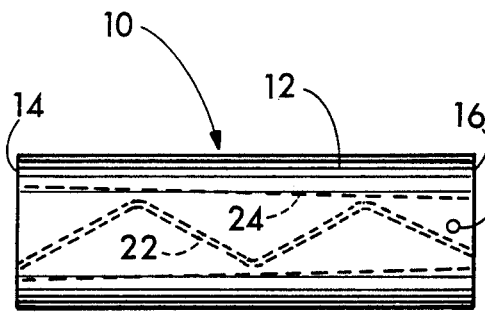
FIG. 4 is a top view of the unsnagger.
Figure 5:
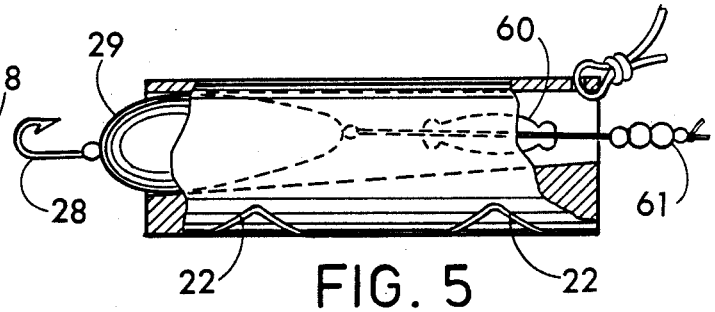
FIG. 5 is another side elevational view of the unsnagger after it has just struck a spoon-type fishing lure.

As for the lure such as a spoon or plug it will be seen in FIGS. 3 and 5 that the opening 24 is of sufficient size to receive at least the upper end of the lure and in this way the opening 24 adjacent the bottom end 14 of the unsnagger is somewhat funnel-like in its shape so that it will slip over the lure thereby directing the force of the impact squarely down the longitudinal axis of the lure to provide the greatest possible jolt to the lure to unsnag it with maximum efficiency. The opening 24 can therefore be thought of as providing a means for orienting the force of the impact. While the weight of the unsnagger is not critical it will typically be between about 1 and about 6 pounds. Good results have been obtained with a weight of between about 2 and 5 pounds. Thus by inspection of FIGS. 3 and 5 it will be seen that the spoon, plug or other lure is able to slide into the unsnagger about one-half to about three-fourths its own length so as to get a more solid push on the hook to more effectively remove it from the log 30.

The unsnagger can be made from steel, lead or other metal either machined or poured into a mold and a plastic coating can be applied for protection and to improve its appearance. It can also be made from cement, concrete or from a variety of plastics with or without heavy fillers such as sand. If made of plastic it can be blow molded with a hollow interior, the hollow interior being filled with a heavy material such as iron, lead, sand or the like to provide the required weight. If formed from hollow plastic it can be provided with a hole having a cap on it so that it can be filled with a heavy filler material and sealed by means of the cap. Such a plastic unit with a hollow interior will have the advantage of allowing its user to add or remove weight by removing loose filler material such as sand or lead shot through the hole sealed by the cap. This will enable the user to adjust the weight to fit the circumstances of use. As a result it is unnecessary to carry unsnaggers of different sizes in the fishing box.

As shown in FIGS. 3 and 5 the opening 24 is offset upwardly as seen in the figures away from the fishing line insertion opening 22. In this way the fishing line will have very little chance of slipping out through the opening 22 once it is inserted. The insertion opening 22 can also be made to have bends in it as shown for the same purpose, namely, to prevent the line 26 once inserted from being removed.

Figure 6:
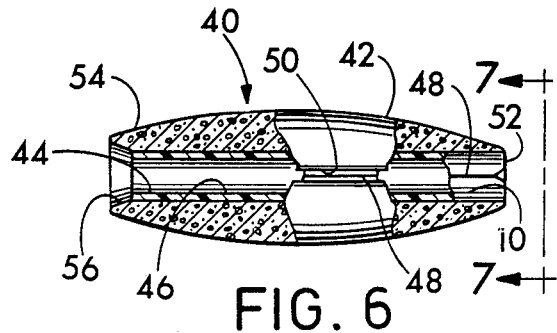
FIG. 6 is a side elevational view partly broken away of another form of unsnagger in accordance with the invention.
Figure 7:
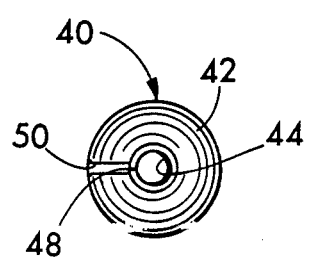
FIG. 7 is an end elevational view taken on line 7—7 of FIG. 6.

Refer now to FIGS. 6 and 7 which show another form of unsnagger 40 in accordance with the invention. As seen in the figures the unsnagger 40 which in this instance is formed from concrete is streamlined, i.e., in this case eliptical so that it is thickest near the center at 42. It includes a central opening 44 through which the fishing line 26 as well as sinkers, swivels, spinners and the like are able to pass when the unsnagger is in use. In this case the opening 44 is provided with a tubular liner 46 formed from lightweight plastic such as polyethylene having a fishing line insertion crack 48 which is aligned with a longitudinal slot 50 extending from the top end 52 of the unsnagger to the bottom end 54. A funnel-shaped opening 56 is provided at the lower end of the opening 44 in the body 40 of the unsnagger to receive the upper end of the lure as already described in connection with FIGS. 3 and 5. The funnel-shaped opening 56 thus provides a means for helping to orient the force of the impact against the hook or the lure as the case may be to provide a more solid push along the hook to efficiently unsnag it. Once the hook has been released from the underwater object 30 the hook, lure and the unsnagger can be lifted to the surface by means of the lanyard 20. This will prevent undue weight from being placed on the line 26 which would otherwise have to be used.

Many variations within the scope of the appended claims will be apparent to those skilled in the art once the principles described above are understood.

What is claimed is:

1. A fish hook unsnagger for jarring loose from an underwater object a hook or a fishing lure that is connected to a fishing line, said unsnagger comprising a weight having a fishing line opening extending therethrough from a first end thereof to a second end and said opening being constructed and arranged to slide freely on the fishing line, said opening being of sufficient size and internal smoothness to slide easily over existing swivels, knots, sinkers and the like connected between the line and the hook so that when the unsnagger is allowed to slide down the line under the influence of gravity said swivels, knots, sinkers and the like will pass through the opening so that the unsnagger will be free to strike the hook and/or fishing lure connected to the hook with sufficient impact to jar the hook or lure loose from an underwater object upon which the hook or lure is caught, said unsnagger having a slot therein for the insertion of the fishing line into the opening and said slot extending all the way from said first end of the unsnagger to the second end and communicating with the opening throughout its length whereby said fishing line can be passed through the slot into the opening and said opening being offset within the unsnagger toward the side of the unsnagger opposite the slot, the side of the unsnagger having the slot being thereby thicker and heavier than the side thereof opposite the slot whereby by having the opening offset away from the slot the heavier weight of the unsnagger on the side of the slot will gravitationally orient the unsnagger causing the side of the unsnagger containing the slot to hang downwardly on the line during use thereby reducing the likelihood of the line from being inadvertently removed from the unsnagger through the slot as it slides on the fishing line toward the hook.

2. The device of claim 1 wherein said unsnagger includes an outer portion having a hollow interior, said hollow interior of the unsnagger contains a heavy filler material to provide the required weight and said filler material is loose inside the outer portion of the unsnagger whereby the user can add or remove the loose filler material to change the weight of the unsnagger to fit the circumstances of use.

3. The device of claim 2 wherein the outer hollow portion of the unsnagger comprises a plastic resin.

4. The device of claim 2 wherein the heavy filler material is sand or shot contained therein in a loose condition.

5. The device of claim 1 wherein the slot has one or more bends therein and the bends are located in said thicker side of the unsnagger.

* * * * *